(12) United States Patent
Calzolari et al.

(10) Patent No.: US 11,916,606 B2
(45) Date of Patent: Feb. 27, 2024

(54) MACHINE LEARNING-ASSISTED ADAPTIVE ANTENNA TUNING

(71) Applicant: QUALCOMM Incorporated, San Diego, CA (US)

(72) Inventors: Diego Calzolari, San Diego, CA (US); David Loweth Winslow, San Diego, CA (US); Guilherme Hoefel, San Diego, CA (US); John Boro, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 17/463,290

(22) Filed: Aug. 31, 2021

(65) Prior Publication Data

US 2023/0061864 A1    Mar. 2, 2023

(51) Int. Cl.
| | |
|---|---|
| *G06N 3/04* | (2023.01) |
| *H04B 17/12* | (2015.01) |
| *G06N 3/045* | (2023.01) |
| *G06N 3/08* | (2023.01) |
| *H04W 8/24* | (2009.01) |

(52) U.S. Cl.
CPC ............. *H04B 17/12* (2015.01); *G06N 3/045* (2023.01); *G06N 3/08* (2013.01); *H04W 8/24* (2013.01)

(58) Field of Classification Search
CPC ... B60L 53/12; G06F 1/26; H02J 50/10; H02J 13/00; H02J 13/00002
See application file for complete search history.

(56) References Cited

U.S. PATENT DOCUMENTS

| | | | |
|---|---|---|---|
| 11,522,639 B2 * | 12/2022 | Kim | H04L 1/1825 |
| 2017/0272108 A1 * | 9/2017 | Filipovic | H04B 1/0458 |
| 2021/0136601 A1 | 5/2021 | Winslow et al. | |
| 2021/0194548 A1 | 6/2021 | Pezeshki et al. | |

OTHER PUBLICATIONS

International Search Report and Written Opinion—PCT/US2022/075401—ISA/EPO—dated Dec. 7, 2022.

* cited by examiner

*Primary Examiner* — Tuan H Nguyen
(74) *Attorney, Agent, or Firm* — QUALCOMM Incorporated

(57) ABSTRACT

Certain aspects of the present disclosure provide techniques for adaptively tuning a wireless data transmission system in an electronic device, including receiving one or more operating characteristics of a wireless data transmission system of a device; determining, using a wireless data transmission system configuration model, a target wireless data transmission system configuration based on the one or more operating characteristics; and implementing the target wireless data transmission system configuration in the wireless data transmission system.

28 Claims, 6 Drawing Sheets

MACHINE LEARNING-ASSISTED ADAPTIVE ANTENNA TUNING

INTRODUCTION

Aspects of the present disclosure relate to adaptive antenna tuning.

Wireless devices, such as smartphones, may have one or more antennas for transmitting and receiving wireless data via a wireless data transmission system. The way in which such devices are used, for example, how a smartphone is being held, can affect the performance of the antennas and thus the performance of the wireless data transmission. Degraded antenna performance may lead to slow wireless data transmission, increased battery usage, and increased wireless network interference, to name just a few issues.

Accordingly, systems and methods and needed for dynamically adapting antenna tuning to improve wireless device performance.

BRIEF SUMMARY

Certain aspects provide a method for adaptively tuning a wireless data transmission system in an electronic device, including receiving one or more operating characteristics of a wireless data transmission system of a device; determining, using a wireless data transmission system configuration model, a target wireless data transmission system configuration based on the one or more operating characteristics; and implementing the target wireless data transmission system configuration in the wireless data transmission system.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
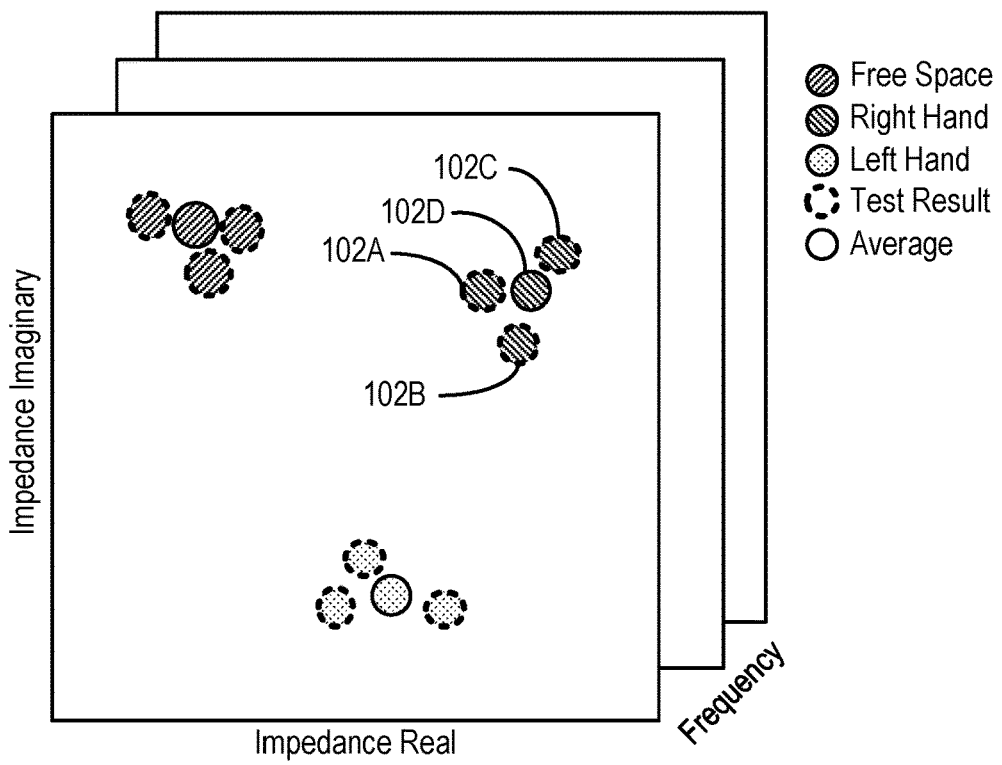
FIG. 1A depicts an example of test results for three different use cases of a wireless electronic device.

Aspects of the present disclosure provide apparatuses, methods, processing systems, and computer-readable media for machine learning-assisted adaptive antenna tuning.

As wireless electronic devices get smaller and more capable, the challenge of designing wireless data transmission systems gets more complicated, at least in part due to the complexity of designing effective antennas within the tight and complex internal confines of such devices. In fact, because contemporary wireless electronic devices may operate on many wireless frequencies at once for both transmission and reception, multiple antennas of different design are often necessary in a single device.

The functional design and packaging challenges are only one aspect of the overall challenge of creating effective wireless data transmission systems for wireless electronic devices. The different modes of usage of such devices poses another challenge because different modes affect the performance of the wireless data transmission system(s) differently.

For example, holding a wireless electronic device, such as a smartphone or tablet computer, in a left hand versus a right hand, or with both hands, may change the wireless data transmission performance because the different hand placements affect different antennas differently. As another example, placement on a surface, placement within a confine (e.g., in a pocket, car, or plane), usage while plugged in (e.g., via a USB or similar cable), and the like, generally affect wireless data transmission performance differently.

Different approaches may be used to improve antenna performance in devices capable of wireless communication. For example, impedance matching and tuning may be performed dynamically to improve the performance of antennas in such devices.

Generally, impedance is the opposition to the flow of energy through a system. Constant electronic signals may have constant impedance and varying electronic signals may have impedance that varies with changing frequency. Impedance generally has a complex value comprising a resistance component, which forms the "real" part of the value, and a reactance component, which forms the "imaginary" part of the value.

Antenna impedance relates to the voltage and current at the input to an antenna. The "real" part of the antenna impedance represents power that is either radiated away or absorbed within the antenna and the "imaginary" part of the impedance represents power that is stored in the near field of the antenna, i.e., non-radiated power. An antenna is generally more efficient and thus more effective when impedance of the system is optimized for the antenna.

Impedance matching refers to designing the input impedance of an electrical load or the output impedance of its corresponding signal source to maximize the power transfer and to minimize signal reflection from the load. Because, impedance varies with variable frequency signals, though, dynamic impedance tuning may be used to tune an antenna to match a radio frequency (RF) front-end so that power transfer from the RF front-end to the antenna is maximized.

Impedance tuning may be performed in an "open-loop" configuration, where preconfigured parameters are used to tune the antenna to the system, or in a "closed-loop" configuration where parameters are adjusted dynamically to tune the antenna to the system. In both cases, such parameters may be used to improve antenna performance (e.g., total radiated power and return loss) in a wireless electronic device.

Aperture tuning is another way to improve wireless communication system performance in an electronic device. Generally, antenna aperture tuning involves modifying the resonant frequency of an antenna to match a specific application or frequency. By tuning the resonant frequency of the antenna for a specific application or frequency, the efficiency of the antenna is improved for that specific application or at that specific frequency. Aperture tuning may thus allow the same antenna to be used more efficiently for multiple applications at multiple frequencies.

One way to perform antenna aperture tuning is to modify the electrical length of the antenna to adjust its resonant frequency. In some aspects, a switch may be used to adjust the resonant frequency of the antenna by connecting the antenna to ground paths of different lengths, thus shifting the antenna's resonance and thereby changing the performance of the antenna without any structural change to the antenna. A capacitor or inductor can also be used to further adjust the resonant frequency and can generally be connected between a switch and a radiating element of an antenna.

Aperture tuning and impedance tuning may generally improve an antenna's performance, such as its band of operation, return loss, bandwidth, gain, and efficiency. In contemporary mobile devices, such as a smartphones, tablet computers, smart wearables, and the like, aperture tuning may beneficially improve the device's ability to operate in multiple bands at different times in what may be referred to as band-select tuning.

Aspects described herein relate to systems and methods for performing adaptive antenna tuning in wireless communication systems. Unlike some conventional methods that rely on fixed configurations for antenna tuning (e.g., based on well-defined use cases), the methods described herein relate to using reinforcement learning to teach an agent to select one or more optimal antenna tuner settings based on feedback data. The antenna tuner settings may generally relate to any manner of tuner in a wireless device, including impedance tuners and/or aperture tuners in various examples described herein. Beneficially, the feedback data may be generated on-device by using estimation models to compare the selected antenna tuner setting(s) to unselected antenna tuner setting(s) in order to determine the performance of the selection. In some aspects, further feedback data may be generated based on sensors in a device as well as feedback from a network communicating with the device wirelessly.

Thus, aspects described herein advantageously allow a device to learn its own optimal wireless communication device configurations, such as impedance tuner settings, aperture tuner settings, and other tuner settings, which reduces the device's sensitivity to manufacturing changes and other external factors, such as the way in which the device is used (e.g., how it is held) and how the device may be modified by a user (e.g., by placing a protective cover on the device). Moreover, lab characterization of specific, well-defined use cases is no longer necessary to achieve the improve antenna performance.

Beneficially, aspects described herein generally improve antenna performance (e.g., by 3-5 dB or more) in devices with wireless communication systems, increase transmission and reception range of such devices, increase battery life of battery-operated devices, and decrease interference in wireless data communication networks used by such devices.

Conventional Use-Case Characterization for Antenna Aperture Tuning

Conventional antenna tuning has been based on determining settings for specific use-cases, such as left-handed or right-handed holding of a device.

FIG. 1A depicts example impedance values for three different use cases (free space, right hand, and left hand) as well as calculated averages for each of the sets of test results. For example, test results 102A-C for a particular use case (an exemplary right handed hold in this example) result in an averaged point 102D. The averaged points may be considered characteristic or representative points for a use case based on the test results. In this example, the test results measure real and imaginary impedance for a given frequency, and the tests may be performed over many different frequencies based on the capabilities of the device being tested.

Figure 1B:
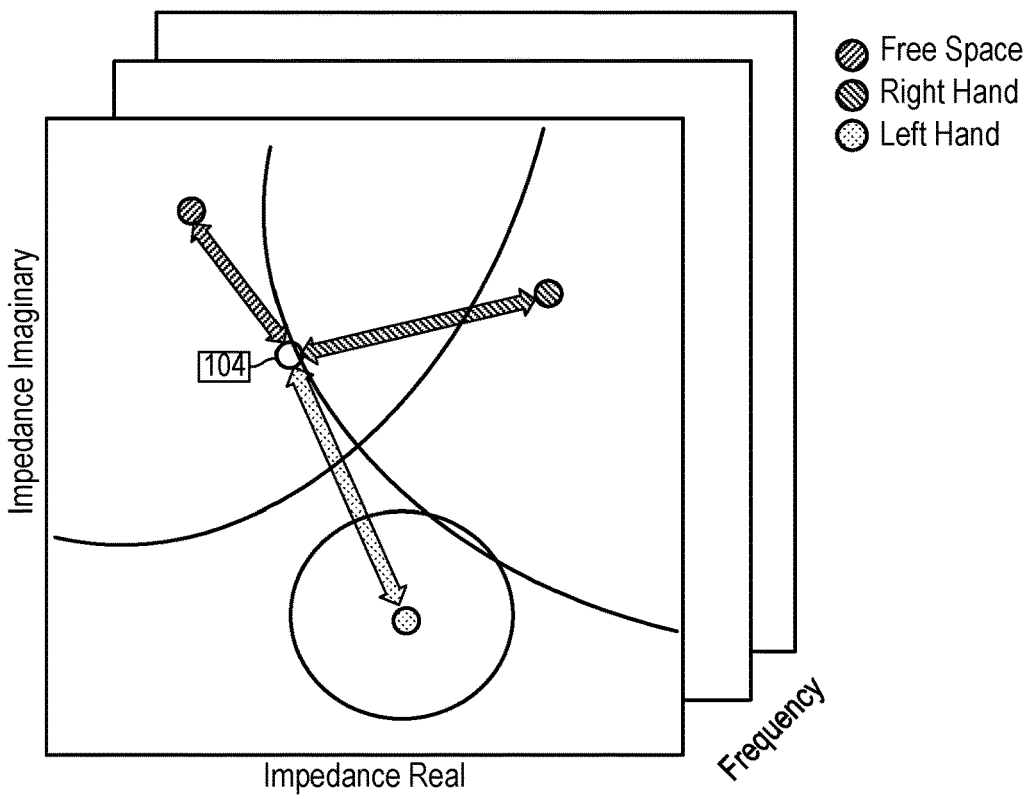
FIG. 1B depicts an example use cases decision boundaries for a wireless electronic device based on measured test results.

Based on the measurement results, simple use case decision boundaries can be determined as depicted in FIG. 1B (as depicted by the arcs). Thereafter, a "live" measurement 104 may be plotted and compared against the representative points for different use cases and/or against the use case decision boundaries to determine how the wireless electronic device is currently being used (e.g., a current use case of the device).

Unfortunately, the initial modeling between measurements and use cases, such as shown in FIG. 1A is time-consuming, costly, and generally under-representative because it is impractical to test the myriad different ways any given device going into production may be used (e.g., with respect to various use cases). For example, a device may be tested in a few different positions to determine a few different use cases, but that testing will rarely be truly representative of the wide variety of different ways the device may be handled by various users. For example, as depicted in FIG. 1B, the decision boundaries cover a wide area around the representative points for each of the three example use cases, and those large areas may be over-representative of a particular use case.

Further as depicted in FIG. 1B, there are many areas where use case decision boundaries overlap such that a point might fall within the bounds of multiple use cases, leading to additional uncertainty in a use case determination. Consequently, using simple, decision boundaries based on representative points as in this example may require additional processing by the wireless electronic device, which slows down operation and uses more power.

More generally, the limited nature of conventional testing leads to limited use case test data and models with limited ability to reliably determine how a device is currently being used (e.g., with respect to a defined set of use cases) based on live data measurements. Notably, use case misdetermination or misprediction can cause the wrong antenna tuner settings to be applied and lead to suboptimal wireless data transmission performance of a device.

To improve upon conventional testing and use case determination, aspects described herein do not rely on use case determination as a prerequisite to determine optimal antenna tuner settings. Rather, aspects described herein determine optimal antenna tuner settings (e.g., for an impedance tuner and/or an aperture tuner) dynamically based on feedback data. In some aspects, an agent is taught through reinforcement learning an optimal policy for selecting antenna tuner settings based on various inputs, a feedback signal, and a selection performance function configured to reinforce the selection of the optimal antenna tuner settings. Beneficially then, use cases need not be determined, and rather the device may adapt to any manner of use case based on a reinforcement learning feedback loop.

Introduction to Reinforcement/Agent Learning

Reinforcement learning is a form of machine learning focused on teaching "agents" (also referred to as "smart agents" or ("AI agents") how to take actions in an environment in order to maximize a reward and/or minimize a penalty for the taken actions. Reinforcement learning differs from supervised learning generally in that labelled input/output pairs are not needed for training an agent, which makes it very useful for scenarios in which gathering sufficient training data for traditional supervised learning would be difficult, such as those described above with respect to FIGS. 1A and 1B regarding characterizing use cases. Reinforcement learning is thus focused on learning the best policy for an agent, which, for example, maximizes a performance function, which may include reward elements that are maximized over time and/or penalty elements that are minimized over time.

A reinforcement learning agent may interact with an environment in discrete time steps or intervals. Generally, at each time step, the agent receives the current state and evaluates a performance function to determine rewards and/or penalties based on that state. The agent then chooses an action from a set of available actions, which is subsequently sent to the environment. The environment moves to a new state based on the action and the new rewards and/or penalties associated with the transition are determined and fed back to the agent. Thus, the ultimate aim of a reinforcement learning agent is to learn a policy that maximizes expected cumulative reward and/or minimizes expected cumulative penalty based on the selection of different actions at different times in a changing environment.

The "policy" employed by an agent may be based on a machine learning model, such a neural network model. For example, various inputs may be provided to a machine learning model and the model may predict an action to take based on the inputs. Reinforcement learning may change parameters of such a model (e.g., weights and biases) over time to improve the model and the policy-based action of the agent based on a performance function.

For example, in the context of antenna tuning, the agent may select an antenna tuner setting (e.g., an "action"), such as an impedance tuner setting, an aperture tuner setting, and/or another tuner setting, based on a policy (e.g., a model) and provide that to the device (e.g., the "environment") to be implemented (e.g., changing the state of the device) for a data transmission. The transmission according to the selected antenna tuner setting(s) may be used to create feedback data, which in-turn may be used to determine a rewards and/or penalties for the agent based on the antenna tuner setting(s) selected for the data transmission. In some aspects, the policy used by the agent may consider various types of input data, such as a measured real impedance along a transmit chain in a wireless data communication system, an imaginary impedance along the transmit chain, one or more operating frequencies of the transmit chain, and one or more current antenna tuner settings (e.g., a current state), such as a current impedance tuner state, a current aperture tuner state, and/or other current tuner states.

Example System for Performing Adaptive Antenna Tuning

Figure 2:
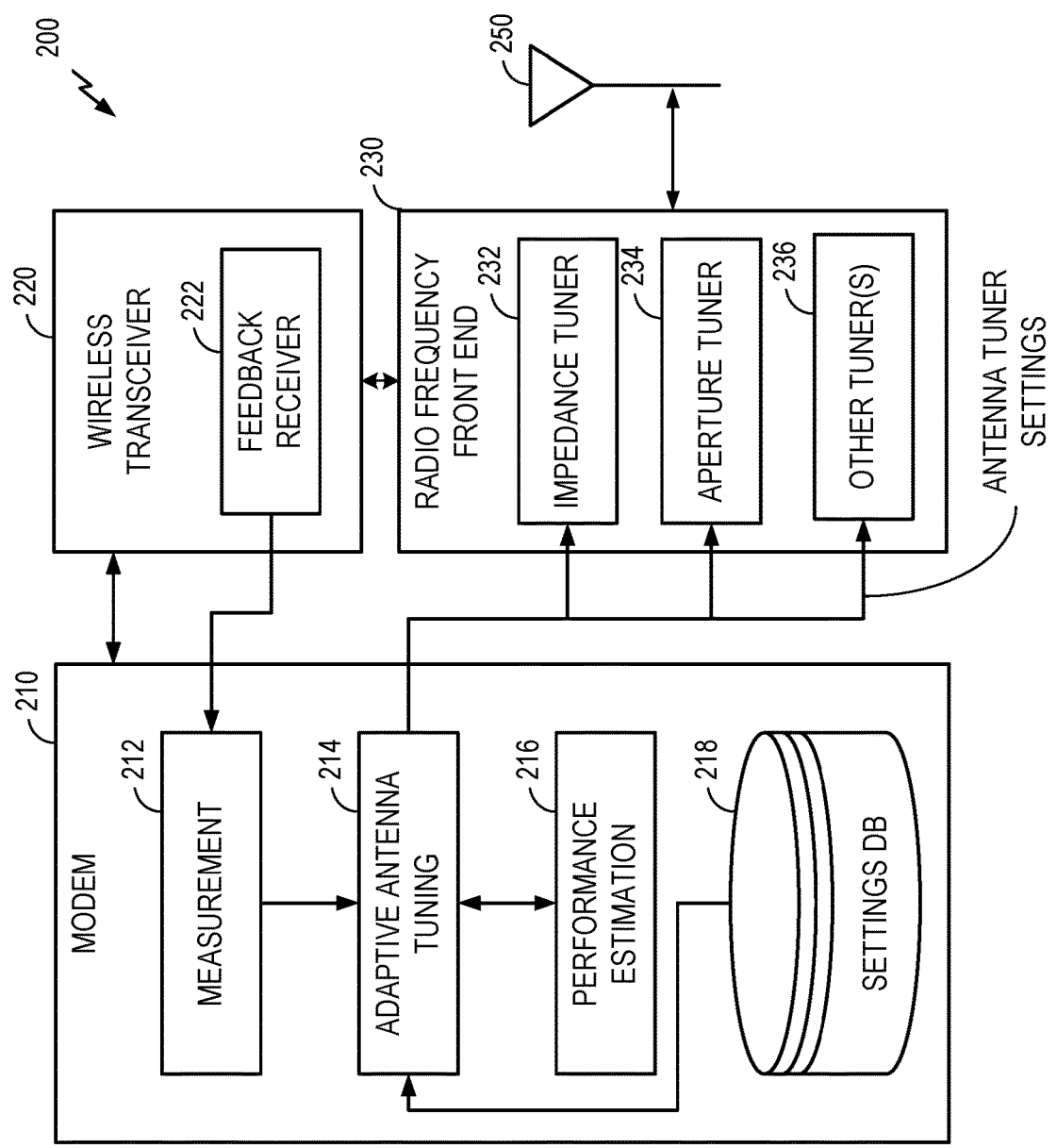
FIG. 2 depicts an example system for performing adaptive antenna tuning in a wireless electronic device.

FIG. 2 depicts an example system 200 for performing adaptive antenna tuning in a wireless electronic device.

System 200 includes a modem 210, which in this example includes a measurement component 212, adaptive antenna tuning component 214, performance estimation component 216, and antenna tuner settings database 218.

Measurement component 212 may be configured to receive measurement data, such as impedance and frequency measurements, from other aspects of a wireless electronic device. For example, measurement component 212 may receive measurements from feedback receiver (FBRx) 222 of wireless transceiver 220 in one aspect. Generally, feedback receiver 222 is a circuit that compares a measurement of a transmitted signal at different points along the transmission chain. For example, a voltage standing wave ratio (VSWR) or return loss may be determined, which provides a measurement of complex impedance of the transmit signal. Then, an aspect of modem 210, such as adaptive antenna tuning component 214, may take the complex impedance and translate it to impedance at the antenna. As above, this antenna impedance may be used to determine how the antenna is affected by different antenna tuner settings, such as an impedance tuner setting, an aperture tuner setting, and/or other tuner settings implemented by impedance tuner 232, aperture tuner 234, and/or other tuner(s) 236, respectively.

Figure 3:
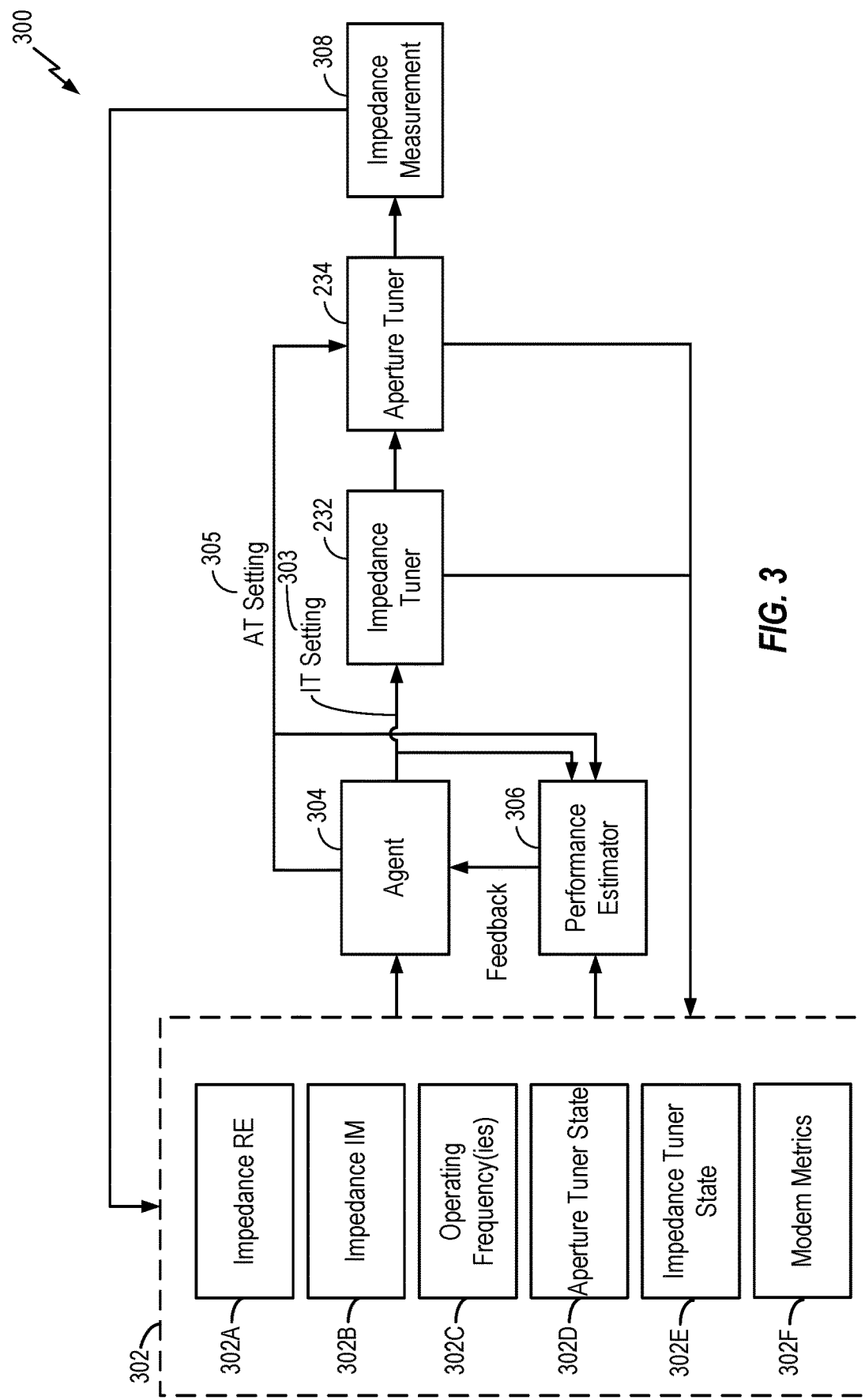
FIG. 3 depicts an example reinforcement learning model architecture.

Adaptive antenna tuning component 214 may implement an agent for determining antenna tuner settings, including settings for impedance tuner 232 and/or antenna aperture tuner 234, as described further with respect to FIG. 3. In some cases, the agent may determine and/or select from settings stored in antenna tuner settings database 218. The settings may include aperture, impedance, and/or other tuner settings that can be implemented by impedance tuner 232, aperture tuner, 234, and/or other tuner(s) 236, and which may be considered aspects of a state of radio frequency front end (RFFE) 230 when implemented. For example, a state of radio frequency front end 230 may be defined by the setting of impedance tuner 232, aperture tuner, 234, and/or other tuner(s) 236.

In this example, radio frequency front end 230 includes an impedance tuner 232 and an aperture tuner 234, which are configured to perform impedance tuning and aperture tuning, respectively. Radio frequency front end 230 further includes other tuner(s) 236, which may include, for example, one or more matching networks for matching a power amplifier's output an antenna to improve power amplifier performance.

Note that radio frequency front end 230 may include many other aspects that are not depicted in this example for simplicity, such as power amplifiers, power trackers, duplexers, hexaplexers, switches, low noise amplifiers, filters, antenna switches, and extractors, to name a few.

Radio frequency front end 230 is further connected to antenna 250. Note that in this example, a single antenna 250 is depicted for simplicity, but radio frequency front end 230 may be connected to a plurality of antennas. Further, this example depicts a single radio frequency front end, but other examples may include multiple radio frequency front ends, such as for different radio access technologies, and for operating on different frequencies simultaneously.

Adaptive antenna tuning component 214 is further configured to provide the antenna tuner settings to impedance tuner 232, aperture tuner 234, and/or other tuner(s) 236 in radio frequency front end 230 in order to improve the performance of antenna 250 (which may be representative of multiple antennas). An example of an adaptive antenna tuning system, as may be implemented by adaptive antenna tuning component 214, is depicted and described in more detail with respect to FIG. 3.

Adaptive antenna tuning component 214 can significantly improve the performance of the electronic device's wireless data transmission system(s). For example, a 3-5 dB improvement in antenna efficiency may be achieved along with reduced power usage, increased battery life, and decreased network interference. Such improvements, while generally beneficial, may be particularly relevant to certain scenarios, such as usage indoor and/or at a cell edge, or when a device is handled in such a way that multiple antennas are covered.

In order to transmit and receive data, modem 210 is connected to wireless transceiver 220, which is in-turn connected to a radio frequency front end 230, which is connected to antenna 250. Note that modem 210 may include many other aspects that are not depicted in this example for simplicity, such as processing cores, read only memories (ROMs), random access memories (RAMs), security components, peripheral components, caches, and others.

Notably, FIG. 2 depicts only selected aspects of a device's wireless data transmission system for simplicity, and many other aspects are possible, such as other processors, memories, sensors, input and output devices, peripheral systems, and the like.

Example Reinforcement Learning Model Architecture

FIG. 3 depicts an example reinforcement learning model architecture 300. Reinforcement learning model architecture 300 may be implemented by, for example, by adaptive antenna tuning component 214 of FIG. 2.

Reinforcement learning model architecture 300 includes an agent 304, which may implement a policy for determining or selecting antenna tuner settings, including impedance tuner settings for impedance tuner 232, aperture tuner settings for aperture tuner 234 in this example. Note that while not depicted in FIG. 3, in additional aspects, agent 304 may be configured to determine tuner settings for other tuners as well, such as other tuner(s) 236 described above with respect to FIG. 2.

In some cases, agent 304 may implement its policy by way of a machine learning model (e.g., a "policy model" or "wireless data transmission system configuration model"), such as a neural network model, which takes one or more inputs 302 (e.g., operating characteristics of a wireless communication system in a device) and outputs a policy decision (e.g., a target wireless data transmission system configuration), such as an impedance tuner setting 303 ("IT Setting" in FIG. 3) and/or an aperture tuner setting 305 ("AT Setting" in FIG. 3). In this example, one or more inputs 302 provided to agent 304 may be used as inputs to agent 304's policy model, include a real impedance measurement 302A, an imaginary impedance measurement 302B, one or more operating frequencies 302C, an aperture tuner state 302D, an impedance tuner state 302E, and modem metrics 302F (e.g., a received signal received power (RSRP) metric; a received signal received quality (RSRQ) metric; a signal to noise metric (SNR/SINR); received signal strength indicator (RSSI); and others). Further, though not depicted, other input data may be used, such as sensor data from the device in which the wireless data communication system is operating.

In some cases, a policy model implemented by agent 304 may output an index or indices associated with antenna tuner settings, including an impedance tuner setting, an aperture tuner setting, and/or other tuners which may include any number of tuner parameters. In some cases, the indices may identify tuner settings stored in a database, such as settings database 218 in FIG. 2.

In some aspects, agent 304 might be configured to further output expected performance (efficiency, matching impedance) for different antenna tuner settings over one or more carriers present on an antenna, allowing other parts of a system (e.g., outside of the adaptive antenna tuning system) to select tuner behavior based on other goals and constraints, such as power amplifier efficiency, non-linearity, accuracy (e.g., as described by error vector magnitude), achievable modulation types, achievable antenna ranks for multiple input multiple output (MIMO) configurations, and others.

As depicted, the complex impedance measurements (including real and imaginary components 302A and 302B, respectively) may be provided by an impedance measurement component 308. In some aspects, the wireless data communication system may be using multiple operating frequencies simultaneously, and in such cases impedance measurements by impedance measurement component 308 may be based the multiple simultaneous frequencies. Note, however, that in such cases the measurement frequencies need not necessarily match all of the operating frequencies.

In some cases, the impedance measurements may be generated by a feedback receiver, such as feedback receiver 222 in FIG. 2. Further, the impedance tuner state and the aperture tuner state may be either known by agent 304 based on the current state of the wireless data transmission system, or otherwise provided by impedance tuner 232 and aperture tuner 234 as a primary reference or a confirmatory reference.

The antenna tuner settings determined by agent 304 (e.g., impedance tuner setting 303, and/or aperture tuner setting 305 in this example) may further be provided to performance estimator 306, which is configured to provide feedback data to agent 304 based on the determined antenna tuner settings. In some cases, the aperture tuner setting 305 and impedance tuner setting 303 may be considered, collectively, a tunecode, and agent 304 attempts to determine an optimal tunecode that includes an optimal impedance tuner and aperture tuner setting that optimizes performance (efficiency, power, linearity) of a radio frequency front end (e.g., 230 in FIG. 2). In one example, maximum power delivery from a power amplifier to an antenna (e.g., 250 in FIG. 2) is achieved based on an optimal tunecode. In various aspects, maximum received power, lowest nonlinearity, and compromises between transmitted power, received power, and linearity are all considered in determining an optimal tunecode.

In some aspects, the feedback data is based on estimated impedances associated with antenna tuner settings not selected by agent 304 (e.g., unselected or "virtual" impedance tuner settings and/or aperture tuner settings in this example). For example, any number of defined impedance tuner settings and/or aperture tuner settings may be stored (e.g., in settings database 218 in FIG. 2) and accessible to agent 304. The estimated impedances based on the antenna tuner settings output by agent 304 may be based on one or more models implemented by performance estimator 306, as further described with respect to the example of FIG. 4.

In some aspects, the feedback data may be further or alternatively based on other indicators. As above, various sensors on a device may provide sensor data that can be used to generate feedback to agent 304. Similarly, indicators from a wireless data network (e.g., signal quality metrics) in data communication with a device may be used to generate the feedback data to agent 304.

Based on the feedback data from performance estimator 306, agent 304 may update its policy (e.g., parameters of its policy model) using reinforcement learning. For example, agent 304 may evaluate a selection performance function that rewards agent 304 for choosing the best adaptive antenna tuning settings based on performance estimates from performance estimator 306, which in this example relate to impedance tuner 232 and aperture tuner 234, but as above, may also include other antenna tuners (e.g., other tuner(s) 236 of FIG. 2). As a further example, the selection performance function may reward selection of adaptive antenna tuner settings that minimize power loss at the antenna.

The selection performance function evaluated by agent 304 may additionally, or alternatively, penalize agent 304 for choosing suboptimal adaptive antenna tuning settings. For example, the selection performance function could include a penalty element for switching between tuner settings to discourage rapid cycling between tuner settings. Generally speaking, the selection performance function may include reward elements and/or penalty elements that cause agent 304 to adapt its settings selection policy over time in a manner that maximizes the reward elements while simultaneously minimizing the penalty elements.

Note that a device implementing reinforcement learning model architecture 300 may enable or disable the feedback loop provided by performance estimator 306 and reinforcement learning as necessary. For example, a new device may be preconfigured with a policy model for selecting impedance and/or aperture tuner settings. Once in use, the new device may enable the feedback mechanism provided by performance estimator 306 and reinforcement learning so that agent 304's policy model is improved over time. After some time, e.g., after a policy model has (or is estimated to have) converged, the feedback loop may be disabled. Further, the feedback loop may be enabled at intervals to ensure that any changes to the device (e.g., a new phone cover being installed) are accounted for by agent 304. When the feedback loop is disabled, agent 304 continues to determine antenna tuner settings, such as impedance tuner setting 303 and aperture tuner setting 305, based on its existing policy without any feedback provided by performance estimator 306.

Beneficially, reinforcement learning model architecture 300 is able to determine aperture tuner settings (e.g., 305) without the need to determine a use case of a device first or at all. Thus, a device implementing reinforcement learning model architecture 300 may be able to adaptively tune its aperture tuner settings based on any use case and without sensitivity to manufacturing differences between devices.

Example Performance Estimator

Generally, a device with a wireless communication system can only "see" the impedance at its antenna(s), the frequency (or frequencies) it is operating at for transmission, and its current antenna tuner states (e.g., impedance and/or aperture tuner states). In order to provide a feedback signal for an agent (e.g., agent 304 of FIG. 3), the device may estimate how the device would have operated using a different antenna tuner settings.

In some aspects, as described below, machine learning-based estimators may be used to simulate the performance of the wireless communication system with unselected antenna tuner settings without physically switching to them, which saves time and power. Further, an additional estimator, which may also be implemented by a machine learning model, may be used to estimate the efficiency of the antenna(s) based on both the actual antenna tuner state(s) and actual measured performance as well as the unselected antenna tuner state(s) and estimated performances in those state(s). Once all of these values are determined, the system can calculate optimal antenna tuner setting(s) (which may be one of the unselected antenna tuner settings) and provide this determination as feedback to the agent to learn.

Figure 4:
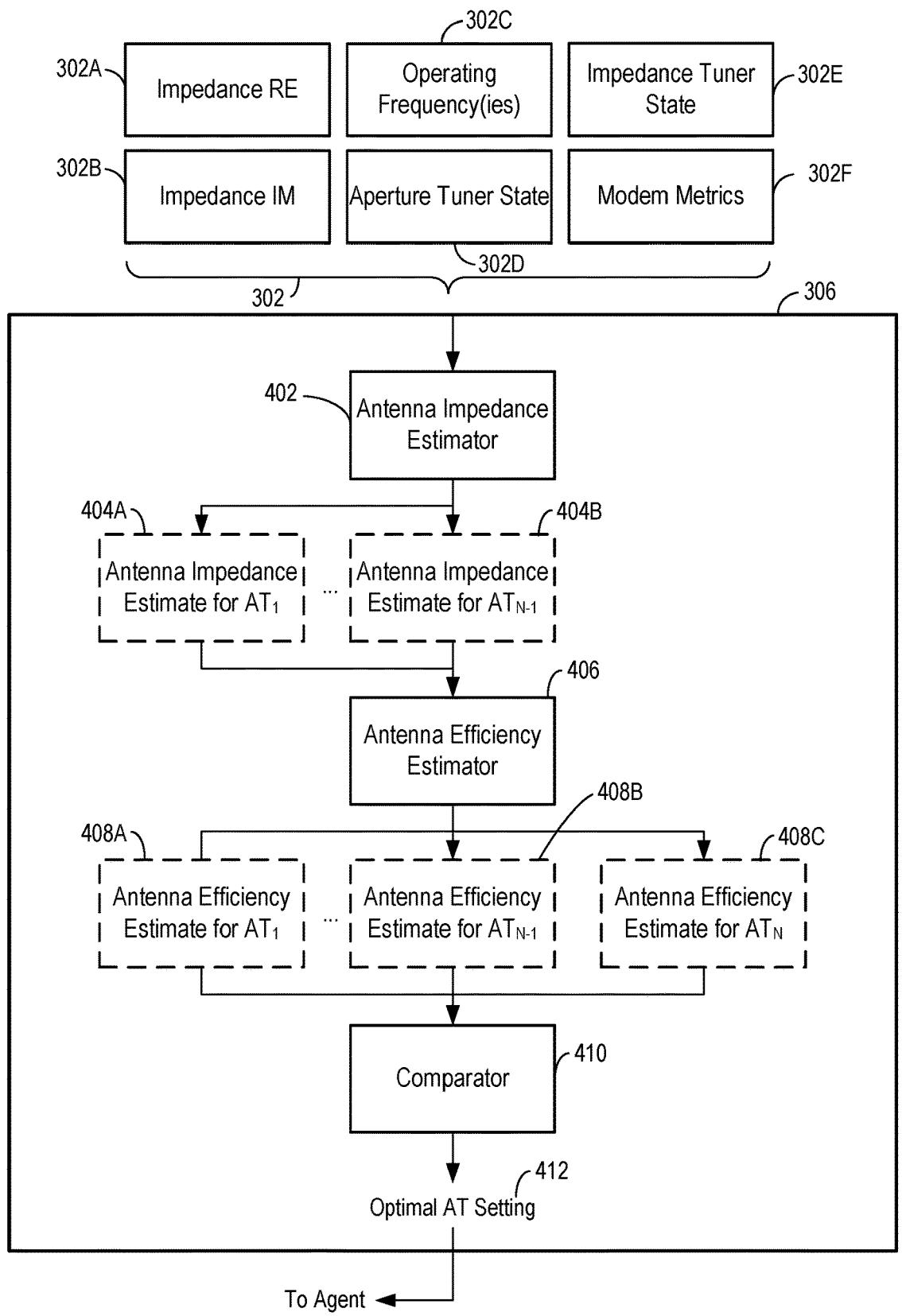
FIG. 4 depicts an example performance estimator.

FIG. 4 depicts an example performance estimator 306, which may be used to provide feedback data to an agent, such as agent 304 of FIG. 3.

In the example performance estimator 306 depicted in FIG. 4, an antenna impedance estimator 402 predicts "virtual" impedance estimates (e.g., estimated operating characteristics of the wireless data transmission system) 404A to 404B, including real and imaginary components, for antenna tuner settings that are not currently in use by the device (e.g., $AT_1$ to $AT_{N-1}$ in this example, where N is the total number of antenna tuner settings). In some aspects, an antenna tuner setting includes settings for an impedance tuner and an aperture tuner, while in other examples, an antenna tuner setting may relate to an impedance tuner or an aperture tuner. In this example, the current antenna tuner setting $AT_N$ may include the current aperture tuner state 302D and the current impedance tuner state 302E.

In some aspects, antenna impedance estimator 402 may be implemented using a machine learning model, such as a trained neural network model, a decision tree, a boosted tree, or another type of model, trained to predict virtual impedances based on aperture tuner settings.

Based on the antenna impedance estimates 404A to 404B, antenna efficiency estimator 406 predicts virtual antenna efficiency estimates (e.g., estimated performance metrics) 408A to 408B. The virtual antenna efficiencies may relate, for example, to the transmit power efficiencies of an antenna based on the different antenna tuner settings (e.g., $AT_1$ to $AT_{N-1}$ in this example). Further, antenna efficiency estimator 406 determines the efficiency of the antenna based on the actual antenna tuner setting, as in current aperture tuner state 302D and impedance tuner state 302E.

Both the virtual antenna efficiencies based on unselected antenna tuner settings (e.g., 408A to 408B) and the actual antenna efficiency based on the current antenna tuner setting (e.g., 408C) are provided to comparator 410 to determine an optimal antenna tuner setting 412. For example, the optimal aperture tuner setting 412 may be the setting that provides the highest transmit power efficiency. The optimal antenna tuner setting 412 may be provided to an agent, such as agent 304 in FIG. 3, as feedback data for performing reinforcement learning, as described above. Thus, the feedback data may be used to help the agent adapt its policy to choose the optimal antenna tuner setting more often based on, for example, the device operating characteristics.

Though not depicted in FIG. 4, other inputs may be considered by performance estimator 306 and further models may be used to estimate virtual performance values that can be compared to actual performance values (e.g., by comparator 410) for determining a best antenna tuner setting. For example, performance estimator 306 may consider indicators provided by a network in wireless data communication with the device, including a received signal received power (RSRP) metric, a received signal received quality (RSRQ) metric, a signal to noise metric (SNR/SINR), a received signal strength indicator (RSSI), to name a few examples. The actual values provided by the network may be compared to estimated values from suitable models in order to select the optimal aperture tuner setting 412.

Example Method of Adaptive Antenna Tuning

Figure 5:
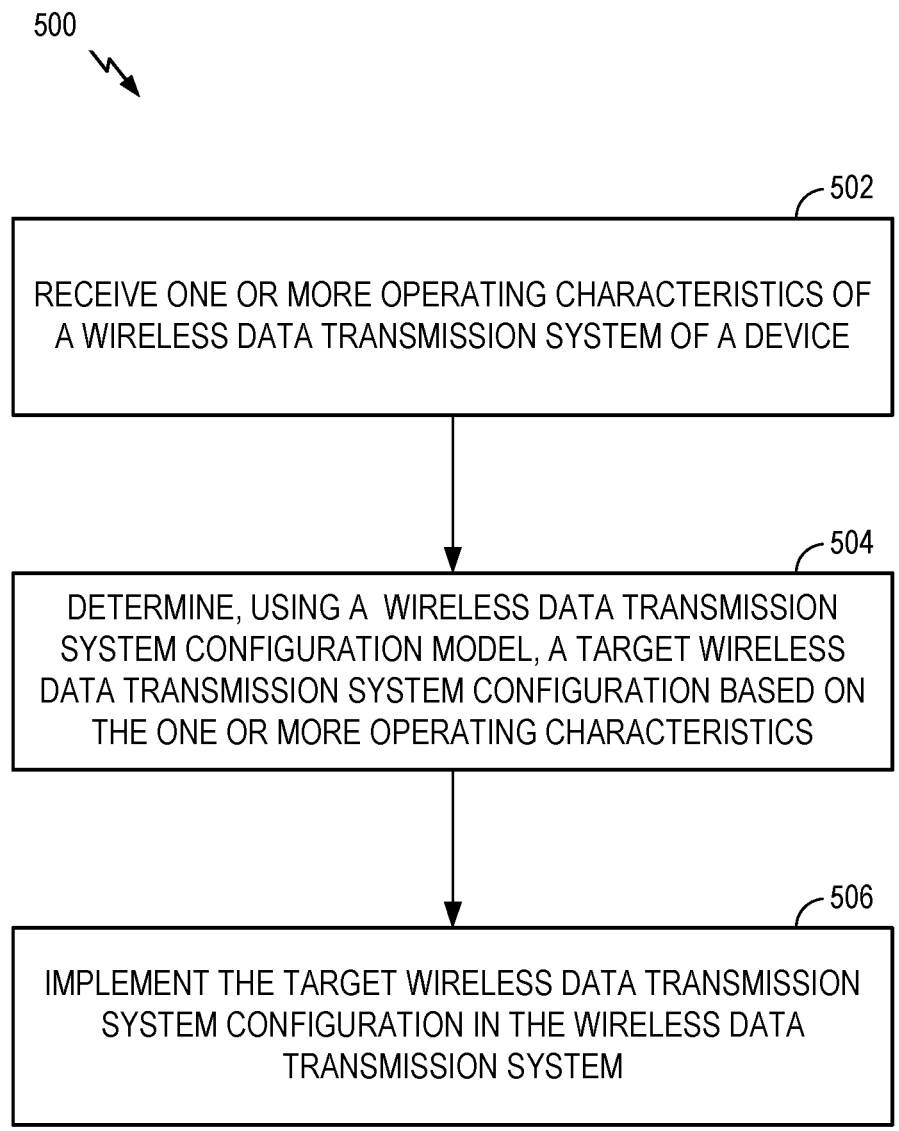
FIG. 5 depicts an example method of performing adaptive antenna tuning.

FIG. 5 depicts an example method 500 of performing adaptive antenna tuning in a device with a wireless data communication system, such as described above with respect to FIGS. 2-4.

Method 500 begins at step 502 with receiving one or more operating characteristics of a wireless data transmission system of a device. For example, the operating characteristics may be like the inputs 302 described with respect to FIG. 3, as well as others, such as sensor data from the device.

Method 500 then proceeds to step 504 with determining, using a wireless data transmission system configuration model, a target wireless data transmission system configuration based on the one or more operating characteristics. For example, the model may be implemented by an agent, such as agent 304 described above with respect to FIG. 3.

Method 500 then proceeds to step 506 with implementing the target wireless data transmission system configuration in the wireless data transmission system.

In some aspects, method 500 further includes determining, using a first estimator model, one or more estimated operating characteristics of the wireless data transmission system using one or more virtual wireless data transmission system configurations different from the target wireless data transmission system configuration, such as described with respect to FIG. 4 with impedance estimator 402. In some aspects, the first estimator model comprises a neural network model.

In some aspects, method 500 further includes determining, using a second estimator model, one or more estimated performance metrics of the wireless data transmission system based on the one or more estimated operating characteristics, such as described with respect to FIG. 4 with antenna efficiency estimator 406. In some aspects, the second estimator model comprises a neural network model.

In some aspects, method 500 further includes determining an actual performance metric based on the implemented target wireless data transmission system configuration, such as described with respect to FIG. 4 with antenna efficiency estimate 408C.

In some aspects, method 500 further includes determining a best wireless data transmission system configuration of the target wireless data transmission system configuration and the one or more virtual wireless data transmission system configurations based on the actual performance metric and the one or more estimated performance metrics, such as described with respect to FIG. 4 with comparator 410.

In some aspects, method 500 further includes generating feedback data based on the determined best wireless data transmission system configuration. In some aspects, the feedback data comprises the best wireless data transmission system configuration, such as described with respect to FIG. 4 with optimal antenna tuner setting 412.

In some aspects, the feedback data comprises one of: a reward signal for the reinforcement learning model if the target wireless data transmission system configuration matches the best wireless data transmission system configuration; or a penalty signal if the target wireless data transmission system configuration does not match the best wireless data transmission system configuration In some aspects, method 500 further includes updating the wireless data transmission system configuration model based on the feedback data. In some aspects, the wireless data transmission system configuration model is a reinforcement learning model.

In some aspects, the actual performance metric comprises an indicator provided by a network in wireless data communication with the device. In some aspects, the indicator comprises at least one of: a received signal received power (RSRP) metric; a received signal received quality (RSRQ) metric; a signal to noise metric (SNR/SINR); or a received signal strength indicator (RSSI). In other aspects, other network key performance indicators (KPIs) or even metrics crowdsourced from other devices on a network may be used as actual performance metrics.

In some aspects, method 500 further includes determining an optimal tunecode for an impedance tuner based on the target wireless data transmission system configuration. Generally, an optimal tunecode is the one for which there is minimal loss between the power delivered from a power amplifier to the power transmitted by the antenna.

In some aspects, the one or more operating characteristics comprise: a real impedance of an element of the wireless data transmission system; an imaginary impedance of the element of the wireless data transmission system; one or more frequencies of the wireless data transmission system; and an antenna tuner state. For example, the antenna tuner state may comprise one or more of an impedance tuner state, an aperture tuner state, and/or other tuner states.

In some aspects, the element is an antenna of the wireless data transmission system, and the target wireless data transmission system configuration comprises an antenna tuner setting. In some aspects, the antenna tuner setting comprises at least one of an aperture tuner setting or an impedance tuner setting.

Example Electronic Device for Performing Adaptive Antenna Tuning

Figure 6:
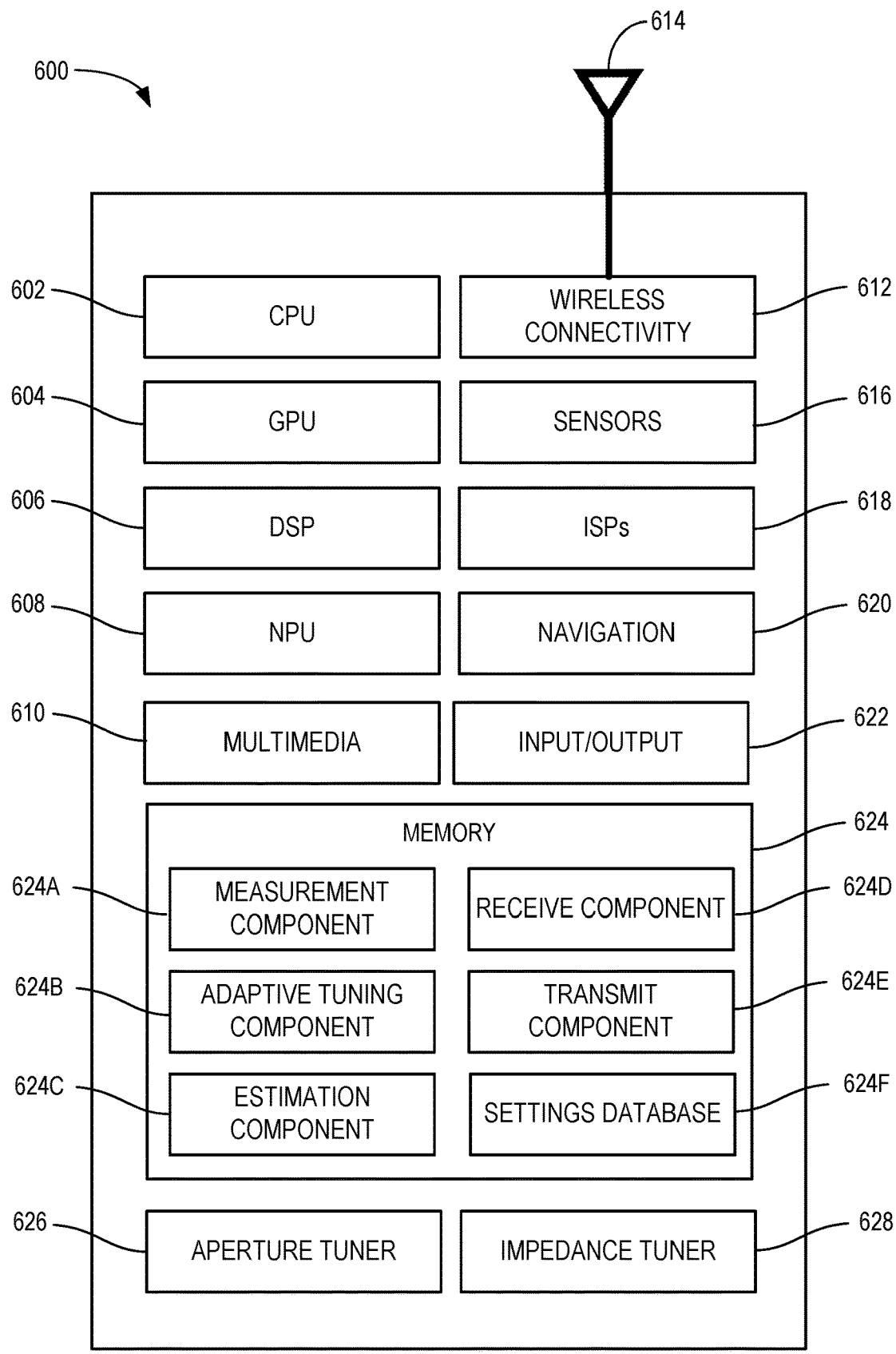
FIG. 6 illustrates an example electronic device that may be configured to perform adaptive antenna tuning, as described herein.

FIG. 6 depicts an example processing system 600 for performing sparsity-aware compute-in-memory, such as described herein for example with respect to FIGS. 2-5.

Processing system 600 includes a central processing unit (CPU) 602, which in some examples may be a multi-core CPU. Instructions executed at the CPU 602 may be loaded, for example, from a program memory associated with the CPU 602 or may be loaded from a memory partition 624.

Processing system 600 also includes additional processing components tailored to specific functions, such as a graphics processing unit (GPU) 604, a digital signal processor (DSP) 606, a neural processing unit (NPU) 608, a multimedia processing unit 610, and a wireless connectivity component 612.

An NPU, such as 608, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 608 is a part of one or more of CPU 602, GPU 604, and/or DSP 606.

In some examples, wireless connectivity component 612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 612 is further connected to one or more antennas 614.

Processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes measuring component 624A, adaptive tuning component 624B, estimation component 624C, receive component 624D, transmit component 624E, and settings database 624F. The depicted components, and others not depicted, may be configured to perform various aspects of the methods described herein.

Processing system 600 further comprises aperture tuner 626, such as described above, for example, with respect to FIG. 2.

Processing system 600 further comprises impedance tuner 628, such as described above with respect to FIG. 2.

Generally, processing system 600 and/or components thereof may be configured to perform the methods described herein.

Notably, in other cases, aspects of processing system 600 may be omitted. For example, multimedia component 610, ISPs 618, and/or navigation component 620 may be omitted in other aspects. Further, aspects of processing system 600 maybe distributed between multiple devices.

Alternative Aspects

Alternative aspects are set out in the following numbered clauses.

Clause 1: A method, comprising: receiving one or more operating characteristics of a wireless data transmission system of a device; determining, using a wireless data transmission system configuration model, a target wireless data transmission system configuration based on the one or more operating characteristics; and implementing the target wireless data transmission system configuration in the wireless data transmission system.

Clause 2: The method of Clause 1, further comprising: determining, using a first estimator model, one or more estimated operating characteristics of the wireless data transmission system using one or more virtual wireless data transmission system configurations different from the target wireless data transmission system configuration; determining, using a second estimator model, one or more estimated performance metrics of the wireless data transmission system based on the one or more estimated operating characteristics; determining an actual performance metric based on the implemented target wireless data transmission system configuration; determining a best wireless data transmission system configuration of the target wireless data transmission system configuration and the one or more virtual wireless data transmission system configurations based on the actual performance metric and the one or more estimated performance metrics; and generating feedback data based on the determined best wireless data transmission system configuration.

Clause 3: The method of Clause 2, further comprising updating the wireless data transmission system configuration model based on the feedback data.

Clause 4: The method of Clause 3, wherein the wireless data transmission system configuration model is a reinforcement learning model.

Clause 5: The method of Clause 4, wherein the feedback data comprises one of: a reward signal for the reinforcement learning model if the target wireless data transmission system configuration matches the best wireless data transmission system configuration; or a penalty signal if the target wireless data transmission system configuration does not match the best wireless data transmission system configuration.

Clause 6: The method of Clause 4, wherein the feedback data comprises the best wireless data transmission system configuration.

Clause 7: The method of any one of Clauses 2-6, wherein the actual performance metric comprises an indicator provided by a network in wireless data communication with the device.

Clause 8: The method of Clause 7, wherein the indicator comprises at least one of: a received signal received power (RSRP) metric; a received signal received quality (RSRQ) metric; a signal to noise metric (SNR/SINR); or a received signal strength indicator (RSSI).

Clause 9: The method of any one of Clauses 2-8, wherein the first estimator model comprises a neural network model.

Clause 10: The method of any one of Clauses 2-9, wherein the second estimator model comprises a neural network model.

Clause 11: The method of any one of Clauses 1-10, further comprising determining an optimal tunecode for an impedance tuner based on the target wireless data transmission system configuration.

Clause 12: The method of any one of Clauses 1-11, wherein the one or more operating characteristics comprise: a real impedance of an element of the wireless data transmission system; an imaginary impedance of the element of the wireless data transmission system; a frequency of the wireless data transmission system; and an antenna tuner state.

Clause 13: The method of Clause 12, wherein: the element is an antenna of the wireless data transmission system, and the target wireless data transmission system configuration comprises an antenna tuner setting.

Clause 14: The method of Clause 13, wherein the antenna tuner setting comprises at least one of an aperture tuner setting or an impedance tuner setting.

Clause 15: A processing system, comprising: a wireless data transmission system; a memory comprising computer-executable instructions; and one or more processors configured to execute the computer-executable instructions and cause the processing system to perform a method in accordance with any one of Clauses 1-14.

Clause 16: A processing system, comprising means for performing a method in accordance with any one of Clauses 1-14.

Clause 17: A non-transitory computer-readable medium comprising computer-executable instructions that, when executed by one or more processors of a processing system, cause the processing system to perform a method in accordance with any one of Clauses 1-14.

Clause 18: A computer program product embodied on a computer-readable storage medium comprising code for performing a method in accordance with any one of Clauses 1-14.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving one or more operating characteristics of a wireless data transmission system of a device;
   determining, using a wireless data transmission system configuration model, a target wireless data transmission system configuration based on the one or more operating characteristics;

determining, using a first estimator model, one or more estimated operating characteristics of the wireless data transmission system using one or more virtual wireless data transmission system configurations different from the target wireless data transmission system configuration;

determining, using a second estimator model, one or more estimated performance metrics of the wireless data transmission system based on the one or more estimated operating characteristics;

determining an actual performance metric based on the target wireless data transmission system configuration;

determining a best wireless data transmission system configuration of the target wireless data transmission system configuration and the one or more virtual wireless data transmission system configurations based on the actual performance metric and the one or more estimated performance metrics;

generating feedback data based on the determined best wireless data transmission system configuration; and implementing the target wireless data transmission system configuration in the wireless data transmission system.

2. The method of claim 1, further comprising updating the wireless data transmission system configuration model based on the feedback data.

3. The method of claim 2, wherein the wireless data transmission system configuration model is a reinforcement learning model.

4. The method of claim 3, wherein the feedback data comprises one of:
a reward signal for the reinforcement learning model if the target wireless data transmission system configuration matches the best wireless data transmission system configuration; or
a penalty signal if the target wireless data transmission system configuration does not match the best wireless data transmission system configuration.

5. The method of claim 3, wherein the feedback data comprises the best wireless data transmission system configuration.

6. The method of claim 1, wherein the actual performance metric comprises an indicator provided by a network in wireless data communication with the device.

7. The method of claim 6, wherein the indicator comprises at least one of:
a received signal received power (RSRP) metric;
a received signal received quality (RSRQ) metric;
a signal to noise metric (SNR/SINR); or
a received signal strength indicator (RSSI).

8. The method of claim 1, wherein the first estimator model comprises a neural network model.

9. The method of claim 1, wherein the second estimator model comprises a neural network model.

10. The method of claim 1, further comprising determining an optimal tunecode for an impedance tuner based on the target wireless data transmission system configuration.

11. The method of claim 1, wherein the one or more operating characteristics comprise:
a real impedance of an element of the wireless data transmission system;
an imaginary impedance of the element of the wireless data transmission system;
a frequency of the wireless data transmission system; and
an antenna tuner state.

12. The method of claim 11, wherein:
the element is an antenna of the wireless data transmission system, and
the target wireless data transmission system configuration comprises an antenna tuner setting.

13. The method of claim 12, wherein the antenna tuner setting comprises at least one of an aperture tuner setting or an impedance tuner setting.

14. An apparatus, comprising:
a wireless data transmission system;
memory comprising computer-executable instructions; and
one or more processors configured to execute the computer-executable instructions and cause the apparatus to:
receive one or more operating characteristics of the wireless data transmission system of a device;
determine, using a wireless data transmission system configuration model, a target wireless data transmission system configuration based on the one or more operating characteristics;
determine, using a first estimator model, one or more estimated operating characteristics of the wireless data transmission system using one or more virtual wireless data transmission system configurations different from the target wireless data transmission system configuration;
determine, using a second estimator model, one or more estimated performance metrics of the wireless data transmission system based on the one or more estimated operating characteristics;
determine an actual performance metric based on the target wireless data transmission system configuration;
determine a best wireless data transmission system configuration of the target wireless data transmission system configuration and the one or more virtual wireless data transmission system configurations based on the actual performance metric and the one or more estimated performance metrics;
generate feedback data based on the determined best wireless data transmission system configuration; and
implement the target wireless data transmission system configuration in the wireless data transmission system.

15. The apparatus of claim 14, wherein the one or more processors are further configured to cause the apparatus to update the wireless data transmission system configuration model based on the feedback data.

16. The apparatus of claim 15, wherein the wireless data transmission system configuration model is a reinforcement learning model.

17. The apparatus of claim 16, wherein the feedback data comprises one of:
a reward signal for the reinforcement learning model if the target wireless data transmission system configuration matches the best wireless data transmission system configuration; or
a penalty signal if the target wireless data transmission system configuration does not match the best wireless data transmission system configuration.

18. The apparatus of claim 16, wherein the feedback data comprises the best wireless data transmission system configuration.

19. The apparatus of claim 14, wherein the actual performance metric comprises an indicator provided by a network in wireless data communication with the device.

20. The apparatus of claim 19, wherein the indicator comprises at least one of:
- a received signal received power (RSRP) metric;
- a received signal received quality (RSRQ) metric;
- a signal to noise metric (SNR/SINR); or
- a received signal strength indicator (RSSI).

21. The apparatus of claim 14, wherein the first estimator model comprises a neural network model.

22. The apparatus of claim 14, wherein the second estimator model comprises a neural network model.

23. The apparatus of claim 14, wherein the one or more processors are further configured to cause the apparatus to determine an optimal tunecode for an impedance tuner based on the target wireless data transmission system configuration.

24. The apparatus of claim 14, wherein the one or more operating characteristics comprise:
- a real impedance of an element of the wireless data transmission system;
- an imaginary impedance of the element of the wireless data transmission system;
- a frequency of the wireless data transmission system; and
- an antenna tuner state.

25. The apparatus of claim 24, wherein:
- the element is an antenna of the wireless data transmission system, and
- the target wireless data transmission system configuration comprises an antenna tuner setting.

26. The apparatus of claim 25, wherein the antenna tuner setting comprises at least one of an aperture tuner setting or an impedance tuner setting.

27. A non-transitory computer-readable medium comprising computer-executable instructions that, when executed by one or more processors of a processing system, cause the processing system to perform a method, the method comprising:
- receiving one or more operating characteristics of a wireless data transmission system of a device;
- determining, using a wireless data transmission system configuration model, a target wireless data transmission system configuration based on the one or more operating characteristics;
- determining, using a first estimator model, one or more estimated operating characteristics of the wireless data transmission system using one or more virtual wireless data transmission system configurations different from the target wireless data transmission system configuration;
- determining, using a second estimator model, one or more estimated performance metrics of the wireless data transmission system based on the one or more estimated operating characteristics;
- determining an actual performance metric based on the target wireless data transmission system configuration;
- determining a best wireless data transmission system configuration of the target wireless data transmission system configuration and the one or more virtual wireless data transmission system configurations based on the actual performance metric and the one or more estimated performance metrics;
- generating feedback data based on the determined best wireless data transmission system configuration; and
- implementing the target wireless data transmission system configuration in the wireless data transmission system.

28. An apparatus, comprising:
- means for receiving one or more operating characteristics of a wireless data transmission system of a device;
- means for determining, using a wireless data transmission system configuration model, a target wireless data transmission system configuration based on the one or more operating characteristics;
- means for determining, using a first estimator model, one or more estimated operating characteristics of the wireless data transmission system using one or more virtual wireless data transmission system configurations different from the target wireless data transmission system configuration;
- means for determining, using a second estimator model, one or more estimated performance metrics of the wireless data transmission system based on the one or more estimated operating characteristics;
- means for determining an actual performance metric based on the target wireless data transmission system configuration;
- means for determining a best wireless data transmission system configuration of the target wireless data transmission system configuration and the one or more virtual wireless data transmission system configurations based on the actual performance metric and the one or more estimated performance metrics;
- means for generating feedback data based on the determined best wireless data transmission system configuration; and
- means for implementing the target wireless data transmission system configuration in the wireless data transmission system.

* * * * *